March 28, 1961 — A. T. COOPER — 2,977,147
WELL FISHING TOOL
Filed Oct. 1, 1957

INVENTOR.
ALEXANDER T. COOPER
BY
Bernard Kriegel
ATTORNEYS.

United States Patent Office 2,977,147
Patented Mar. 28, 1961

2,977,147
WELL FISHING TOOL
Alexander T. Cooper, 2775 Baltic Ave., Long Beach, Calif.
Filed Oct. 1, 1957, Ser. No. 687,546
1 Claim. (Cl. 294—65.5)

This invention relates to a well fishing tool means, and more particularly to a fishing tool employing magnet means to assist removal of loose metal objects from a well hole.

During drilling operations of a well, parts of the drilling apparatus may become broken and detached from the drilling apparatus, such parts including cones, nuts, washers, parts of the drilling bit, and other objects. Such loose objects are commonly termed "fish." To continue drilling of a well hole, such fish must be removed from the well hole.

The operation of removing a fish from a well hole normally consumes considerable time and labor because the drilling string must be removed from the well hole, a fishing tool attached to the end of the drilling string, and the tool and string run into the hole. Normally, such fishing tools employ mechanical means for grasping and holding the fish as it is being removed from the well hole. In such prior mechanical fishing tools, a fish which was being lifted out of the well hole often became detached therefrom by striking sides of the well hole and thereby required another fishing operation.

This invention contemplates a magnetic fishing tool employed in combination with a mechanical fish recovery and retaining means whereby the fish may be positively held by the fishing tool and may be readily removed from the well hole without loss of the fish.

It is, therefore, a primary object of this invention to disclose and provide a novel fishing tool employing mechanical fish recovery means and magnetic fish holding or retaining means.

An object of the invention is to disclose and provide a fishing tool wherein magnetic means are employed to positively retain said fish therein while mechanical recovery means are actuated.

Another object of this invention is to disclose and provide a well fishing tool wherein magnet means are floatingly mounted within the well fishing tool so that a fish may be urged upwardly into the tool and held therein by the magnet means before the open end of the fishing tool is closed.

A still further object of this invention is to design and provide a positive magnetic well fishing tool which affords means for first magnetically securing the fish within the well tool and for then securely retaining the fish therein for withdrawal of the fish from the well hole.

Generally speaking, an exemplary well fishing tool may comprise a hollow, cylindrical, elongated body member provided with a mechanical fish recovery means carried at the bottom thereof and including a plurality of bendable prongs or fingers for closing the open end of said body member after a fish has been trapped therewithin. This means is shown in my Patent No. 2,266,739, issued December 23, 1941. This invention contemplates the inclusion of a magnet means movable longitudinally within the body member for drawing and holding a metal fish in a chamber provided by the hollow body member. Actuating means are releasably carried within the hollow body member for causing the fish recovery means; that is, bendable fingers, to be urged downwardly and radially inwardly to extend across the open end of the body member after the fish has been urged therein.

Other objects and advantages of this invention will be readily apparent from the following description of the drawings.

Figure 1:
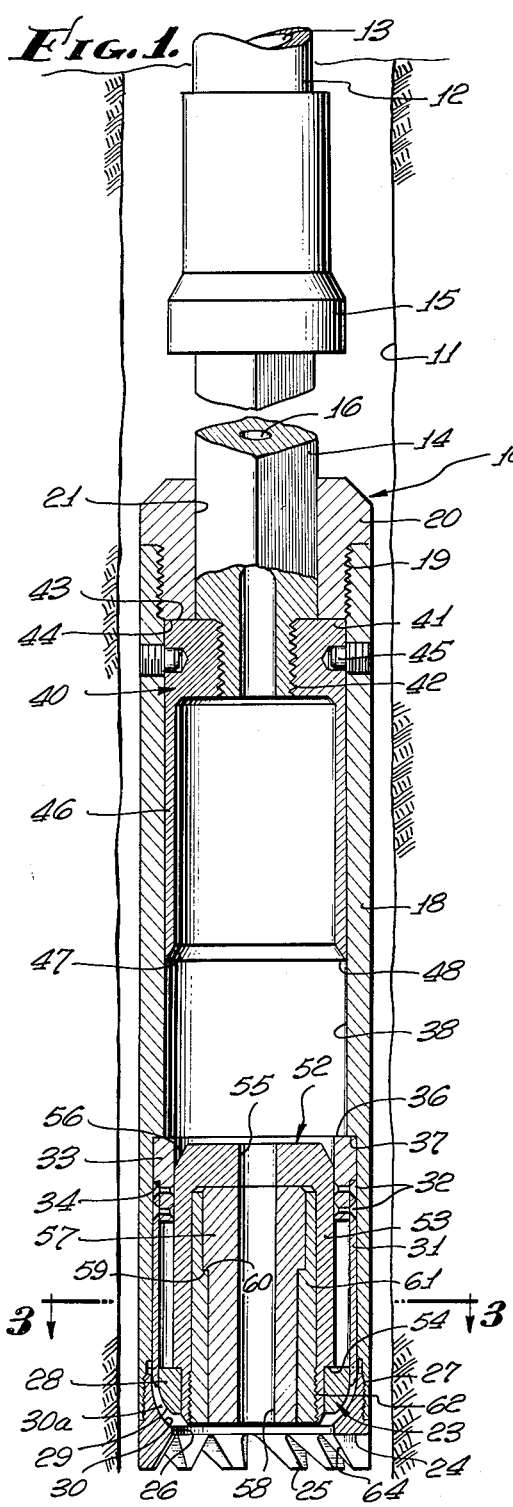
Fig. 1 is a sectional view of a fishing tool embodying this invention, the tool being shown in a well hole and the section being taken in a vertical plane passing through longitudinal axis of the tool.

A fishing tool means is generally indicated at 10 in Fig. 1 and is illustrated as being positioned within a well hole 11 and carried by a drilling string or pipe 12. The drilling string 12 is provided with a through passageway 13 to provide circulation of fluid therethrough. The lower end of the string may be provided with a kelly 14 disposed below a stop collar 15. The kelly is similarly provided with a through passageway 16 for circulation of fluid.

The fishing tool means 10 may comprise an elongated, hollow, cylindrical body member 18 provided with internal threads 19 at its upper end for threaded engagement with a plug 20. The plug 20 is provided with a through bore 21 for slidably receiving the lower end of the kelly 14.

At the bottom end of the cylindrical body member 18 may be supported mechanical fish recovery means generally indicated at 23 and similar to those disclosed in Patent No. 2,266,739. The fish recovery means 23 may include a base member or shoe 24 provided with a plurality of circumferentially arranged, downwardly directed teeth 25 for cutting and scraping the bottom of a well hole. The shoe 24 is provided with an enlarged central opening 26 and may be threadedly connected to the lower end of the body member 18 as at 27. The shoe 24 has secured therewithin an annular guide ring 28. The guide ring 28 and the shoe 24 are provided with corresponding spaced, downwardly and radially inwardly curved surfaces 29 and 30 respectively which define an inwardly curved passageway 30a to provide guiding means for guiding movement of a plurality of circumferentially arranged bendable fingers 31. Each finger 31 is normally disposed with its lower end projecting into the passageway 30a formed by the guide ring and the shoe and with its upper end secured as by suitable rivets 32 to a ring 33. The ring 33 may be provided with a downwardly directed, external rabbeted portion 34 for reception of the upper ends of said fingers. The fingers 31 may be made of any suitable metal material such as relatively thin (.10"–.50") section metal bands of sheet steel sufficiently flexible to be bent as the fingers are passed through the curved passageway 30a provided between shoe and the guide ring.

The top annular edge face 36 of ring 33 may be normally seated against an internal, downwardly facing annular shoulder 37 provided on the body member 18. The edge face 36 has sufficient width to project inwardly beyond the internal surface of the body member which defines a chamber 38.

Means for actuating fingers 31 to cause movement thereof through passageway 30a and to cause extension thereof beneath a fish and across bottom opening 26 (Fig. 2) may comprise a ram means 40 normally positioned at the upper end of the body member 18. The ram means 40 includes a head 41 provided with a threaded through bore for threaded engagement as at 42 with the lower end of the kelly 14. The head 41 normally seats as at 43 against the plug 20 and against the downwardly directed annular face 44 provided on kelly 14 adjacent the threads at 42. The head 41 is releasably secured in such upper position in the body member 18 by any suitable means such as a pair of diametrically opposed shear pins 45.

The ram means 40 also includes a hollow, downwardly extending, elongated ram skirt 46 provided with an internal, outwardly flaring annular edge face 47. The bottom edge face 48 of the skirt 46 is adapted to contact at 49 the top edge face 36 of ring 33 for driving the ring 33 downwardly and for causing the fingers 31 to curve radially inwardly through guide passageway 30a into the position shown in Fig. 2.

Magnet means 52 are normally positioned with the mechanical fish recovery means 23 as shown in Fig. 1. The magnet means 52 may comprise an outer shell or casing 53 of suitable metal such as steel provided with a downwardly facing external annular shoulder 54 for seating contact with the top face of guide ring 33. This seating contact limits downward longitudinal movement of the magnet means and serves to retain the magnet means within the chamber 38. The shell 53 is slidable with respect to ring 33 and the guide ring 28. The upper portion of shell 53 may be ported as at 55 for circulation of well fluid and the outer top edges of the shell casing may be beveled as at 56 for slidable guiding cooperation with the outwardly flaring, internal edge 47 on the ram skirt 46. Within the shell 53 may be secured a magnet member 57 of any suitable shape and form, said magnet being illustrated of cylindrical form provided with a through bore 58 in communication with bore 55 of the shell 53. The magnet 57 may be provided with a downwardly facing annular shoulder 59 engageable with an upwardly facing shoulder 60 provided on a magnet insulating sleeve 61 of any suitable material, such as brass. The insulating sleeve 61 may be threaded as at 62 to the lower end of the shell 53.

The magnet means 52 as seen in Fig. 1 is normally positioned by shoulder 54 at the bottom of the hollow, cylindrical body member 18 so that the bottom face of the magnet member 57 will be positioned in proximity to the opening 26 in the shoe 24 and, therefore, close to a fish resting on the bottom of a well hole. The magnet means 52, it will be noted, is capable of movement upwardly within chamber 38 of the hollow body member and within the ram skirt 46 until the top face thereof engages the bottom internal face of head 41. The magnet means 52 is thus provided limited, longitudinal movement within the body member 18.

Figure 2:
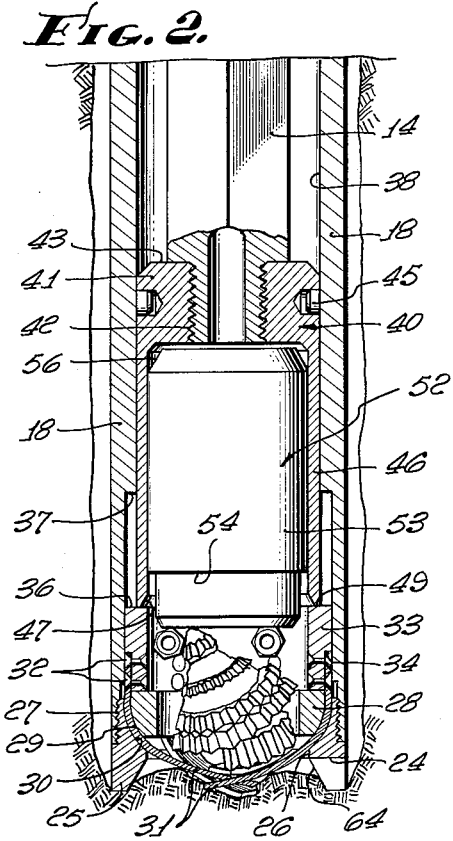
Fig. 2 is a fragmentary sectional view of the tool shown in Fig. 1 and shows the parts of the tool in fish recovery and retaining relation.
Figure 3:
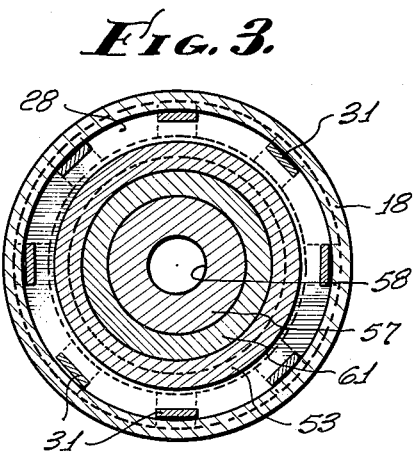
Fig. 3 is a transverse sectional view taken in the plane indicated by line III—III of Fig. 1.

In operation, the fishing tool 10 may be connected to the end of drilling string 12 and run into the hole until the shoe 24 approaches the bottom of the hole. As the shoe approaches the fish the inwardly tapered surfaces 64 on the teeth 25 direct the fish radially inwardly and toward the magnet means 52. As the shoe moves downwardly over the fish, the magnet means magnetically attracts the fish and as contact is made with the fish the magnet means 52 is retracted and moved longitudinally upwardly within chamber 38. As the magnet means 52 moves upwardly the fish is drawn into the lower end of the chamber 38 until the base shoe 24 engages the bottom of the well hole. The tool may then be rotated through the kelly in order to loosen the formation at the bottom of the well hole so as to facilitate actuation of the fingers 31. When this is accomplished, the shear pins 45 may be broken by application of force thereto in any suitable manner and the drilling string lowered so as to move the actuating ram means 40 downwardly toward the bottom of the chamber. When the lower edge face 48 of the skirt 46 engages the top annular face 36 of the ring 33 the bendable fingers 31 are urged downwardly and curved radially inwardly by the guide passageways 30a between the shoe and the guide ring 28. The fingers in final position intermesh as shown in Fig. 2 beneath the fish and further support and retain the fish within the bottom end of chamber 38. It will be noted that the magnet means 52 is received within the skirt 46 when the fingers are ultimately positioned underneath the fish. The drilling string, tool and fish may then be withdrawn from the well hole without danger of the fish scraping the sides of the well hole and without possible loss of the fish because of the retention thereof in the chamber 38 by the magnet means and by the bendable fingers 31.

It will be noted that in normal operation of the magnetic fishing tool means of this invention the fish is magnetically and mechanically held within the chamber 38 and that the magnet means is floatingly mounted within said chamber for limited, longitudinal movement therein. In the event the formation which is being drilled is very hard so that the bendable fingers cannot be fully actuated to intermeshed relationship beneath the fish, the magnet means will serve to retain and hold the fish at the bottom of the fishing tool while it is being withdrawn from the well hole. The fingers may be partially actuated into tight grasping contact with sides of the fish in such position and thus the danger of losing the fish while it is being withdrawn from the well hole is substantially eliminated.

It will also be noted that circulation of fluid is provided through the fishing tool means by the provision of the through bores in the magnet means. Thus, fluid within the chamber 38 is not trapped to resist longitudinal movement of the magnet means within the chamber.

It will be readily understood by those skilled in the art that various modifications and changes may be made in the magnet means described above which come within the spirit of this invention and all such modifications and changes coming within the scope of the appended claim are embraced thereby.

I claim:

In a magnetic well fishing tool having a chamber adjacent its open end, the provision of: guiding means secured on the open end of said tool, said means having a central opening and downwardly, radially, inwardly curved, circumferential passageway surrounding said central opening; a plurality of vertical, circumferentially spaced bendable fingers slidably mounted in said chamber, the inner and upper ends of said fingers being connected to a contact ring slidable in said chamber with the lower free end portions normally projecting into and resting in said curved passageway; a magnet slidably and floatably mounted in said chamber and within said fingers and normally resting on said guiding means for retention within said chamber, said magnet having a bottom face normally extending into said central opening of the guiding means and being in proximity to the open end of said tool; and a hollow ram means slidably and releasably positioned in said chamber, including a downwardly extending, hollow skirt having a lower end adapted to engage the contact ring and enclose the magnet, said ram and skirt being movable downwardly around said magnet to move said contact ring to force the bendable fingers through said passageway and to permit said magnet to move within said ram to hold objects enclosed by the bendable fingers.

References Cited in the file of this patent
UNITED STATES PATENTS

| Number | Name | Date |
|---|---|---|
| 2,266,739 | Cooper | Dec. 23, 1941 |
| 2,493,992 | Murphy et al. | Jan. 10, 1950 |
| 2,595,632 | Bivings et al. | May 6, 1952 |
| 2,613,980 | Hawkins | Oct. 14, 1952 |
| 2,700,567 | Fortenberry | Jan. 25, 1955 |
| 2,709,104 | Gibbs | May 24, 1955 |
| 2,729,494 | Trowbridge | Jan. 3, 1956 |
| 2,734,767 | Donahm | Feb. 14, 1956 |
| 2,778,669 | Goodwin | Jan. 22, 1957 |
| 2,833,353 | Walton et al. | May 6, 1958 |